Feb. 24, 1959  T. A. GREEN ET AL  2,874,573
INDICATING GAGE
Original Filed July 28, 1950  3 Sheets-Sheet 1
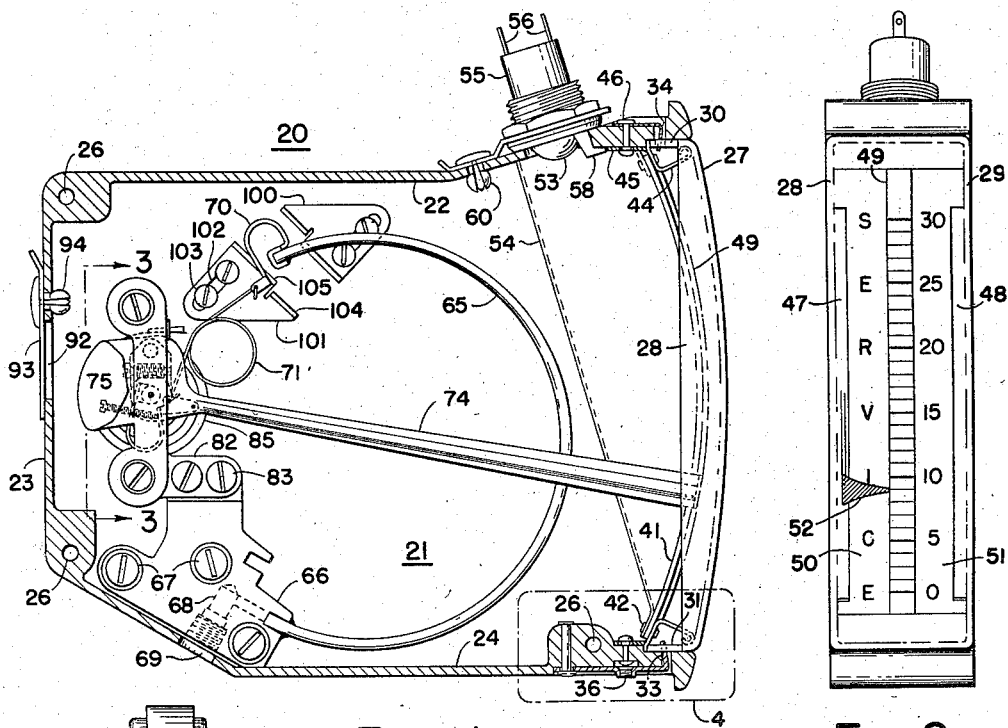
Fig. 1
Fig. 2
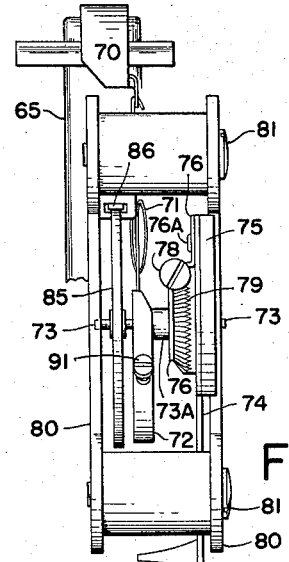
Fig. 3
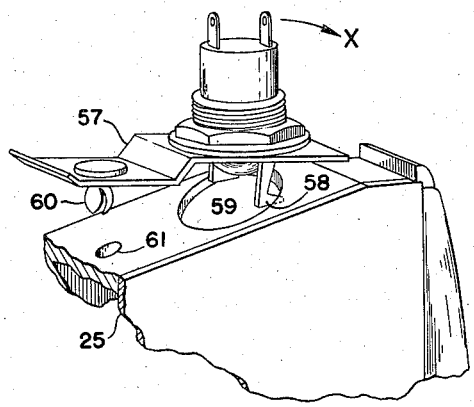
Fig. 5
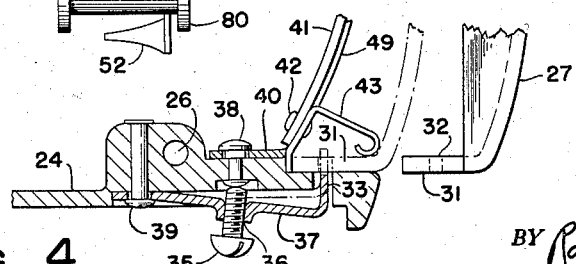
Fig. 4
INVENTORS
THOMAS A. GREEN,
HARVARD H. GORRIE,
JACK F. SHANNON
AND TREVOR FINK
BY Raymond W. Junkins
ATTORNEY Feb. 24, 1959  T. A. GREEN ET AL  2,874,573
INDICATING GAGE
Original Filed July 28, 1950  3 Sheets-Sheet 2
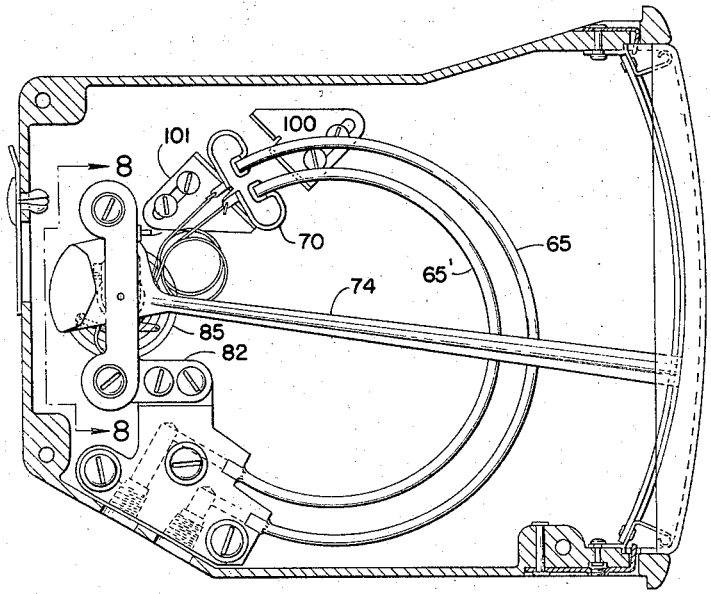
FIG. 6
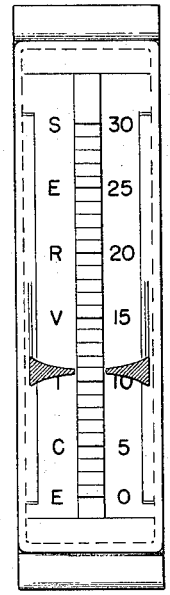
FIG. 7
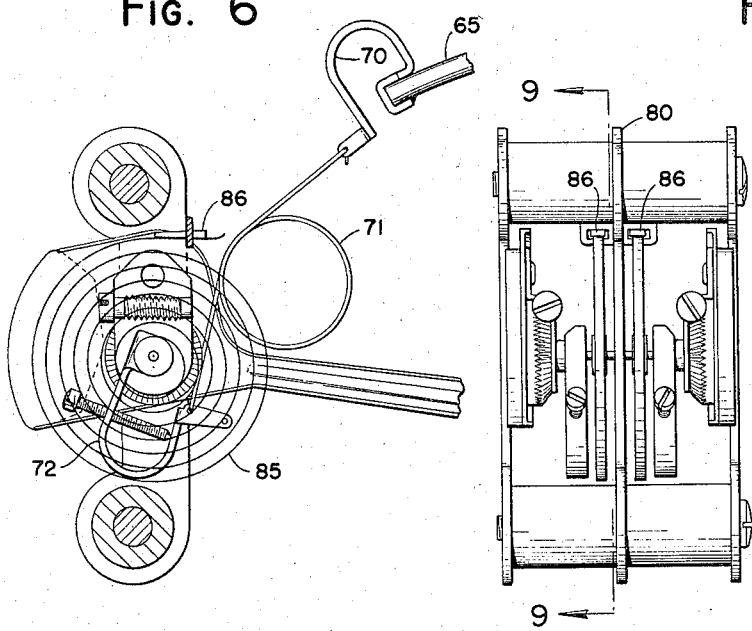
FIG. 9
FIG. 8
INVENTORS
THOMAS A. GREEN,
HARVARD H. GORRIE,
AND JACK F. SHANNON
TREVOR FINK
BY Raymond W. Jenkins
ATTORNEY Feb. 24, 1959
T. A. GREEN ET AL
2,874,573
INDICATING GAGE
Original Filed July 28, 1950
3 Sheets-Sheet 3
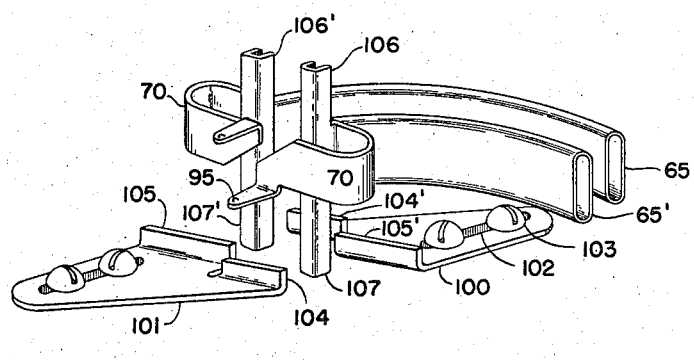
Fig. 10
Fig. 13
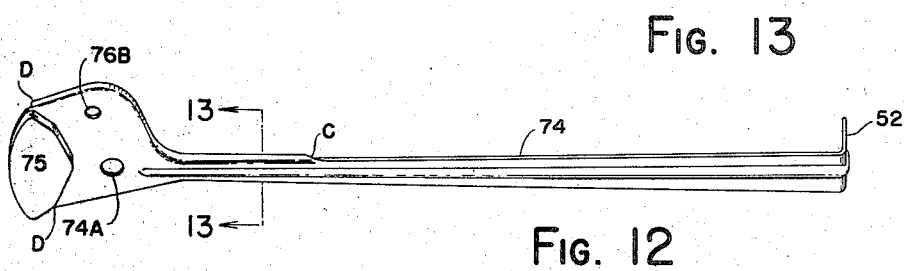
Fig. 12
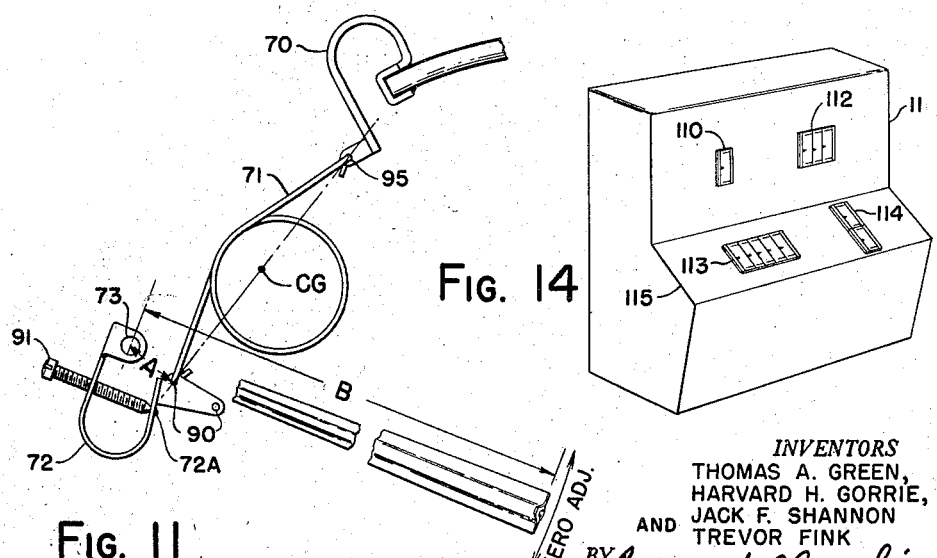
Fig. 11
Fig. 14
INVENTORS
THOMAS A. GREEN,
HARVARD H. GORRIE,
AND JACK F. SHANNON
TREVOR FINK
BY Raymond W. Junkins
ATTORNEY

United States Patent Office 2,874,573
Patented Feb. 24, 1959

2,874,573
INDICATING GAGE

Thomas A. Green, Willoughby, Harvard H. Gorrie, Cleveland Heights, Jack F. Shannon, Euclid, and Trevor Fink, University Heights, Ohio, assignors to Bailey Meter Company, a corporation of Delaware Continuation of application Serial No. 176,382, July 28, 1950, now abandoned. This application January 16, 1956, Serial No. 559,165

13 Claims. (Cl. 73—414)

Our invention relates to measuring instruments and particularly to indicating pressure gages of the vertical edgewise class.

The general shape is of a relatively thin rectangle with one end or edge of the rectangle fitted for visually observing the indication of measurement by having one or more pointers arranged to move along a vertically located scale path. Preferably the unit is mounted with the indicative scale substantially flush with a panel board, the majority of the unit projecting behind the panel.

Our unitary construction is not, however, restricted to vertical edgewise panel mounting. One widely accepted usage is for table mounting on bench or console type control panels where the scale edge of the unit is horizontal or at a slight inclination with the horizontal and with most of the unit projecting beneath the bench or console top.

Furthermore, the unitary enclosed construction allows the ganging-up or stacking of numerous units with the indicative scales parallel or end-to-end. On the other hand, the unit may be incorporated in an assembly of metering or control apparatus to advantage.

While we have chosen to designate our invention as related to pressure gages, we so-name a general class without meaning to restrict the usefulness of the invention in the measurement of other variable quantities, qualities, conditions, positions, or the like. For example, the indicator to be described may provide a visual manifestation of the magnitude of such variables as fluid rate of flow, temperature, smoke density, static pressure, speed, the position of an object; or the interrelation of measurable values or positions such as a visual comparison of fluid flow rates, pressures, or the like. Such variables, to be made visually available, may be translated into proportional pressure values to effectively actuate our device which may then provide an indication in terms of the variable. Furthermore, the indication may be of a control force or loading value and may constitute the receiver of a fluid pressure telemetering system.

One object of our invention is to provide an indicating pressure gage of unitary construction adapted for universal mounting or arrangement in multiple or with other apparatus.

Another object is to provide a miniature type of indicator for minimizing space and weight requirements in panel board assemblies.

A further object resides in providing a construction adapted to the ready ganging or grouping of a plurality of our indicators.

Another object is to provide an indicating receiver of substantially universal adaptability to different forms of variables having wide variety of ranges or values.

A further object is to provide an indicating pressure gage having improved range and zero adjustability.

Another object lies in the provision of an indicator having a minimum susceptibility to vibration, shock, or error due to tilting as experienced in pitch and roll in a ship or locomotive.

Still other objects will be apparent from a study of the drawings, the description thereof, and of our claims.

In the drawings:

Fig. 1 is a sectional elevation of a single tube gage.

Fig. 2 is a front face view of the assembly of Fig. 1.

Fig. 3 is a view of a portion of the assembly of Fig. 1 taken along the line 3—3 in the direction of the arrows.

Fig. 4 is an enlarged view of that portion of Fig. 1 enclosed by dot-dash line and designated 4.

Fig. 5 is an exploded view of a portion of Fig. 1.

Fig. 6 is a view, similar to Fig. 1, of a double tube gage.

Fig. 7 is a front edge view of the assembly of Fig. 6.

Fig. 8 is a view of a portion of the assembly of Fig. 6, taken along the line 8—8 in the direction of the arrows.

Fig. 9 is a sectional view of the assembly of Fig. 8 taken along the line 9—9 in the direction of the arrows.

Fig. 10 is a perspective view of a portion of Fig. 6.

Fig. 11 shows a modification of a portion of Fig. 9.

Fig. 12 is an enlarged view of an indicator pointer.

Fig. 13 is a section of the pointer of Fig. 12, along the line 13—13, in the direction of the arrows.

Fig. 14 is a perspective view of a panel showing mounting possibilities of our gage.

Referring now in particular to Fig. 1, we show therein a side elevational view of our preferred apparatus as embodied in what is sometimes termed a vertical edgewise indicator. The housing 20 is formed as a die casting obtaining lightness, with rigidity, strength and dust tightness. The shape is in general rectangular with a flat back mounting wall 21, top wall 22, bottom wall 24 and a rear wall 23. The near side is normally covered by a removable side plate 25 (Fig. 5) which may be held to the housing 20 by screws threadable into holes 26. For purposes of illustration the housing 20 of Fig. 1 has been sectioned slightly below the ledge (Fig. 5) which provides a resting place for the cover 25.

The housing 20 has no fixed front wall (to the right as viewed in Fig. 1) but the opening is desirably closed by a molded transparent window 27 which may be of glass or a clear plastic. The latter is preferred as less susceptible to breakage through handling, vibration or shock. The window 27 is formed with a long radius protrudance to the right (Fig. 1) beyond the limits of housing walls 21, 22, 24. The two sides 28 and 29 of window 27 extend rearwardly to join the forward edges of back wall 21 and of cover 25. Along the top a rearward projection 30, and along the bottom a similar projection 31, enter the confines of the housing as shown. The projection 31 is provided with a hole 32 which may be adapted to receive a spring end 33 as shown in Fig. 1 or in the dotted position of Fig. 4. In similar manner the upper projection 30 is provided with a hole receiving a more rigid spring end 34. Figs. 1 and 2 show the window 27 in its assembled location with projections 30 and 31 receiving the ends 33, 34 and thus holding the window tightly closing the end opening formed by the housing 20 and cover 25.

Provision is made for easy assembly as well as for ready removal of the window portion 27 for inspection and cleaning of the scale, pointer, etc. Figs. 1 and 2 show the window in its assembled position. Fig. 4 is an enlarged detail of a lower right-hand portion of Fig. 1 illustrating the operation to be performed for removing or inserting window 27.

Referring now particularly to Fig. 4 the dot-dash outline to the left shows the window structure in the same assembled location as in Fig. 1. If it is desired to remove the window structure then a lifting screw 35 may be threaded upwardly through the tapped hole 36 of the leaf spring 37 until the upper end of screw 35 engages the fixed lower end of rivet 38. Continued threading of screw 35 into hole 36 flexes the right-hand end of spring 37 (around its pivot 39) downwardly thus withdrawing the pin end 33 from the hole 32 to a position shown in solid line in Fig. 4.

Such withdrawal of the pin 33 from the hole 32 allows an operator, through grasping the lower portion of window 27, to move the lowermost projection 31 outwardly from the wall 24 until the pin 34 no longer engages the upper projection 30 and the window 27 is completely removed. It may be reinserted through a reverse operation of first engaging the hole in upper projection 30 with the pin 34 and then sliding the lower portion of the window inwardly until it completely closes the end cavity of the assembly. Thereafter a backing off of the screw 35 allows pin 33 to enter the hole 32 and lock the window in place. The screw 35 may be left partially inserted in the cavity 36 or may be removed as is shown in Fig. 1.

Referring again to Fig. 4 it will be seen that the rivet 38 serves additionally to hold the scale plate assembly by engaging a projection 40 thereof. The scale plate 41 itself is curved to an arc corresponding to the travel of the indicating pointer and may be the same or slightly different than the outward surface arc of the window 27. It is only essential to maintain sufficient clearance between the pointer, scale plate 41 and inner surface of window 27, at the mid travel position of the pointer.

The lowermost end of the scale plate 41 receives a rivet 42 holding to it a spring clip 43 effectively spacing the scale plate 41 from the inner lower edge of the window housing. At the upper end of the scale plate 41 a similar spring clip 44 is provided as well as a projection 45 of the scale plate (similar to the projection 40). The pin clip 34 as well as the projection 45 are held by a rivet 46 to the top wall 20.

The forwardly arched scale plate 41 is recessed along its edges as at 47, 48 providing clearance paths for movable pointers. Centered along the arc face of the scale plate 41 is a raised scale portion 49 upon which are engraved or painted the scale graduations. Preferably the side portions 50, 51 contain information, relative to the scale graduations, of "Service" which may be flow, pressure, or the like; and of numerals 0, 10, 20, etc. relating to the "Service" and to the scale graduations.

Preferably the pointer end 52 (Fig. 2) travels over the depressed surface 50 (or 51) with clearance thereover and with its indicating end adjacent to graduations on the elevated portion 49. As viewed in Fig. 1 it will be observed that the pointer 52 does not extend beyond the arc of the surface 49 and does not in any respect overlap the graduations or produce parallax in reading the gage.

In the present embodiment illumination of the unit is accomplished by a recessed light bulb 53 mounted in top wall 22 behind the window 27 and scale plate 41. A light reflecting surface 54 may comprise a metallic or similar plate held in position by the rivet 42. The plate 54 may preferably be of U-shape having side walls spaced from the rear wall 21 and the inside of cover 25 to allow pointer travel. This substantially prevents light from the source 53 entering the housing surrounding shield 54 and minimizing eye viewing of working parts of the instrument behind the shield 54 through the slots 47, 48. Normally the scale plate 41 may be of some translucent plastic or similar material upon which the graduations and other indicia are painted or engraved so that they will stand out in contrast to the lighted scale plate itself when the latter is illuminated by the source 53 and reflection from the surface 54.

The light source 53 may be held in a convenient socket assembly 55 having terminals 56 and the assembly is removably mounted in a clip 57 (Fig. 5) having one or more locking prongs 58 engageable with the inner surface of a hole 59 formed in the upper wall 22 of the housing 20. The assembly is shown in Fig. 1 in its normal operation position wherein the prongs 58 are in engagement and a spring button 60 carried by the clip 57 is thus expanded through a hole 61 in the top of wall 22.

From the assembled position (Fig. 1) the assembly 53, 55, 56, 58, 60 cannot be loosened or pulled from the unit, in any direction except that shown by the arrow X of Fig. 5. In other words, any strain on 55 or 56, as by wires or conduit, toward the observer of Fig. 1, or away from the observer, or toward the left, will not cause a pull-out of the assembly due to the gripping of wedge prongs 58; and those are the normal directions of undesired strains upon 55, i. e., away from the back of a panel through which the window 27 projects. Desired removal is, however, readily accomplished by pivoting the assembly toward the rear of the panel in the direction of the arrow X (Fig. 5).

The operative or active element of our improved indicator is illustrated in Fig. 1 as a Bourdon tube 65 having one end permanently fastened to a base casting or forging 66 which is in turn held by screws 67 to the back 21 of the housing 20. All of the contents of the housing 20 are supported relative to the back plate 21 so that the cover 25 may readily be removed without disturbing any of the active elements which may continue in operation.

The interior of the Bourdon tube 65 communicates with a passage 68 and the lower wall 24 is provided with a clearance opening 69 to allow pipe connection to the passage 68.

The free end of the Bourdon tube 65 is connected through an element 70, connecting link 71 and U-shaped member 72 to angularly position the shaft 73. The shaft 73 is pivotally supported by an assembly held together by screws 81. One of the plates 80 has an extension 82 through which screws 83 pass into base 66 providing a rigid mounting for the shaft 73. Carried by the shaft 73, in addition to the U-shaped member 72, is an enlarged hub 73A and a toothed disc 79. Angular motion of the shaft 73, by the Bourdon tube 65, through the agency of elements 71 and 72, angularly moves the elements 73A and 79.

The pointer arm 74 has a weighted end portion 75. As shown in Fig. 12 the pointer arm has a hole 74A clearing the shaft 73. In Fig. 3 the pointer arm 74 and weight 75 are at the right of toothed disc 79 and carry a bracket 76 which spans the disc 79 to encircle the hub 73A on the left-hand side of disc 79. The bracket 76 is fastened to the pointer arm 74 by a rivet 76A entering the pointer arm 74 by way of hole 76B.

Carried by the bracket 76, and engaging with the toothed disc 79 is a worm 78 extending in a plane parallel to pointer arm 74. Turning of the worm 78 in the teeth of disc 79 angularly moves the assembly 52, 74, 75, 76, 76A and 78 around the disc 79 and shaft 73. This provides a zero adjustment for the pointer 52 relative to the scale graduations 49 without movement of the shaft 73 or any of the elements which cooperate to angularly position the shaft under the dictates of the Bourdon tube 65. The bracket 76, between hub 73A and rivet 76A, locks worm 78 snugly into engagement with teeth 79 thereby eliminating error due to clearances required for manufacture and operation.

Carried also by the shaft 73 is one end of a hair spring 85, the other end being adjustably clamped as at 86 to an extension of a plate 80, for taking up lost motion of the assembly.

As previously mentioned the Bourdon tube 65 angularly positions the shaft 73 through the agency of an element 70, connecting link 71 and U-shaped member 72. Reference may be had to Fig. 11 which shows this driving system to larger scale and additionally shows our improved range adjustment.

The member 72 is fastened at one end to the shaft 73 and its other end carries an extension having a plurality of range holes 90 through which we may selectively pass one end of the link 71. A screw 91 is threaded through an arm of the member 72 and has its end bearing against the other arm of the member in a hole or bearing dimple 72A. Adjustment of the screw 91 serves to position the holes 90 relative to the pivot 73 and to thus vary the dimension A relative to the length B of the pointer arm. Thus the selective holes 90 and the adjusting screw 91 provides a means for varying the ratio of A to B and thus varying the range of pressure which must act upon the Bourdon tube 65 to accomplish a predetermined travel of the pointer 52 over the scale 49. Initial adjustment of screw 91 stresses the U member 72 toward an open position so that the screew is always tightly effective across the arms of the U.

Both the zero adjusting screw 78 and the range adjusting screw 91 are accessible through an opening 92 (Fig. 1) normally covered by a clip 93 held in place by the spring plug 94.

In Fig. 11 we show the connecting link 71 formed with a spring-like loop approxiately centered between the pivot locations 90, 95 and with its center of gravity CG normally in line with the pivots 90, 95. The link is preferably made of .020 beryllium copper wire #2 hard and with a complete loop of approximately ½" in diameter. As shown in Fig. 3 the cross-over ends at 360° are spaced to prevent rubbing friction.

Shaping the link 71, as shown in Fig. 11, both as a spring-like loop and with a desired location of the center of gravity, has been found to be the most desirable constructional arrangement to minimize adverse effects of vibration, shock, inertia, harmonics, and the like effects between the Bourdon tube and the various elements connected thereto through the agency of the link 71. Furthermore, the construction is preferred where the unit is to be subjected to pitch and roll or sway conditions which accentuate inertia effects. For some ranges or conditions we may form link 71 as a straight link or in other desired configuration.

At this point we may observe that the system being described is equally applicable to the measurement and indication of either positive pressures or of negative pressures. In the latter case it may be desirable to turn the unit upside down and reverse the scale which would then be graduated from zero to whatever negative pressure were desired for total movement of the pointer 52.

Fig. 10 shows to somewhat enlarged scale the stop system for Bourdon tube travel. Fig. 1, having a single Bourdon tube, uses the same general arrangement. Stop plates 100, 101 are identical and interchangeable. The plate is provided with a slot 102 and screws 103 adjustably fastening the plate to the back 21 of the housing 20. Each of the plates, at its leading edge, is provided with an upturned stop portion 104. A similar stop portion 105 is staggered somewhat relative to portion 104.

The element 70 is shaped as is shown in Fig. 10 and is reversible and interchangeable for use on either of two Bourdon tubes. It is of relatively stiff material and form is provided as assembly with an initial bending to provide the basic zero adpustment; to take care of variations in the length of the Bourdon tube and link and to maintain angularity of arm 74.

As may be seen in Fig. 10 the element 70 has a channel shaped end projecting as at 106, 107 beyond the cross-section of the Bourdon tube. The central portion of the channel section confines and seals the end of the Bourdon tube as well as comprising a soild driving connection between the movable end of the Bourdon tube and the link 71. Considering the innermost Bourdon tube (Fig. 10) the extension 107 may travel only between stops 104, 105' which are respectively adjustable by screws 103. On the other hand, the outermost Bourdon tube 65 is limited in the travel of its free end by extension 107' engaging stops 105, 104'. The staggered relation of the spans between these pairs of stops is due to the fact that the extension 107' travels a different path than the extension 107.

Under normal assembled operation the extensions 107, 107' may move freely at small clearance with the inner surface of the back 21 while the extensions 106, 106' may move freely at small clearance with the inside of the cover plate 25. The extensions 107, 107', 106 and 106' permit however only a relatively small sideways whip or motion of the free end of the Bourdon tubes before such motion is stopped by engagement of said extensions with the back wall 21 or with the plate 25. At the same time the stops 104, 105', 105, 104' not only limit the total travel along arcuate paths of the extensions 107, 107' but tend to prevent extreme whip or similar motion of the Bourdon tube which might otherwise seriously damage the parts driven thereby.

Reference may now be had to Fig. 12 which shows to enlarged scale the pointer assembly comprising the pointer arm 74 having at the right-hand end the pointer 52. From the pointer, to some location C, the pointer arm 74 is ribbed for strength against whipping and twisting. It is somewhat tapered from the pointer 52 to location C with the widest portion of the taper near the pointer 52. We have found it quite desirable to so construct the pointer arm 74 providing progressively greater cross-sectional weight away from the pivot hole 74A toward the pointer 52.

Fig. 13 shows a cross-section of the pointer arm 74 at the line 13—13 of Fig. 12 and it will be seen that the arm is bent over to channel shape at approximately the location C, toward the pivot hole 74A and in fact along both sides of the head of the assembly to some location such as D—D. Adjacent the location D—D a small weight 75 is fastened to the head of the pointer arm. As previously mentioned the head of the assembly is provided with a clearance hole 74A which freely encloses a hub of the shaft 73; and is also provided with a hole 76B for receiving the rivet 76A. We have found that it is desirable to carry the channel cross-sectional shape past these two holes to the left to some location D—D to give transverse strength against shock, whip, and the like and protect against the possibility of the localized weight 75 bending the head which is normally of rather thin metal. As mentioned the arm 74 is tapered in an increasing direction from near the pivot hole 74A outwardly to the pointer 52 with considerable weight moment toward the pointer end as compared to the moment arm of the weight 75. The incremental weight is low along the pointer arm but the moment is high. The entire pointer structure as shown in Fig. 12 provides what we have found to be an optimum distribution of weight and rigidity and the assembly of arm 74, weight 75, parts 73, 73A, 78, 79, 76A, 72, 85 and 91 is statically and dynamically balanced. It has proven completely acceptable for service subject to vibration, shock, pitch, roll and the like adverse conditions. The pointer assembly differs radically from prior constructions with which we are familiar which usually taper in a decreasing direction toward the pointer end 52.

After the pointer arm assembly is statically and dynamically balanced it is mounted in the unit, and, with the unit in a vertical position (Figs. 1 and 2) the pointer will remain in any given position. The hairspring 85 is then given an initial bias such that the pointer 52 rests at its lowermost travel position (opposite zero) which is actually about one p. s. i. above zero pressure (atmospheric) within the Bourdon tube. Under this bias condition the hairspring is fastened as at 86 and the link 71 should just fit the distance between holes 95—90.

The Bourdon tube elements 65, 70 are not balanced and are subject to vibration, harmonics, etc. On the other hand the pointer assembly is balanced. It is this balance, plus the loop link 71, which prevents undesired movements of the Bourdon tube end from being transmitted to, and observed at, the pointer 52. The flexing of the loop 71 allows the Bourdon tube which is unbalanced to move or vibrate without affecting the pointer which is balanced.

While we have described in some detail the structure of Fig. 1 in illustration of a single Bourdon tube indicator, we have shown in other figures of the drawing the arrangement of a double pointer indicator whose edge face may be similar to that shown in Fig. 7. Fig. 6 shows an inner Bourdon tube 65' in addition to the structure of Fig. 1. The general arrangement of driving and adjustment elements is the same for both Bourdon tube systems and the majority of the parts are interchangeable or reversible as the case may be. Fig. 10, previously referred to, shows to enlarged view the stop system for the two tubes.

Fig. 8 illustrates a combining of two sets of the parts described in connection with Fig. 3, while Fig. 9 shows a section through Fig. 8 along the line 9—9. It will be apparent from the study of these drawings that the unit is readily adapted to single pointer indication or to double pointer indication and furthermore it will be observed that the Bourdon tubes may be subjected to either plus or minus pressures, it being only necessary to properly arrange the zero location and the scale graduation.

Fig. 14 has been added to indicate the versatility of location and mounting of our improved indicator upon panel board structure. At 110 we indicate the vertical edgewise scale mounting of the unit on the vertical front face of a panel 111; at 112 the multiple side-by-side mounting of a plurality of indicators on the same vertical panel face; at 113 the side-by-side ganging, and at 114 the end-to-end ganging, of a plurality of our indicators mounted on the horizontal or inclined bench board or console surface 115 of a panel structure. These are indicative only of various mounting arrangements to which our indicators are adaptable. It emphasizes that the assembly may be mounted in any plane or direction without affecting the normal operation of the working parts.

This application is a continuation of our co-pending application Serial Number 176,382, filed July 28, 1950, now abandoned.

What we claim as new and desire to secure by Letters Patent of the United States, is:

1. In a measuring instrument for visually advising the value of a variable measurement, position, or the like; a relatively thin rectangularly shaped housing having an open front end wall, a removable window closely filling the opening, a scale plate located within the housing behind the window for observation therethrough, said scale plate substantially filling the opening and bowed to a long radius toward the window, the scale plate having graduations or other indicia representative of the desired measurement, a shaft mounted pointer having a long radius arm with the pivot axis near the rear interior wall of the housing, the pointer arranged to move over the visual length of the scale plate in cooperation with the indicia thereon, the scale plate having clearance with a side wall of the housing through which clearance the pointer arm is movable about its pivot, a pressure receiving Bourdon tube having one end rigidly mounted to the interior of the housing and having a free end movable in the plane of pointer arm travel, and a driving connection from said Bourdon tube free end to angularly position said pivot shaft, said driving connection including a spring wire formed with a 360° loop intermediate its ends and having one end connected with said Bourdon tube free end and its other end connected with the pivot shaft of the pointer, the loop arranged to lie in the plane of travel of said free end and offset until the center of gravity of the wire is in line with the points of connection of the two ends of the wire.

2. The combination of claim 1 wherein the said wire is in the order of .020 inch diameter beryllium copper and the loop has a diameter approximately one-half the distance between the connection ends of the wire.

3. The combination of claim 1 including a U-shaped element movable in the plane of travel of said free end, one leg of the U formed as a channel section receiving the free end of the Bourdon tube for pressure sealing the same and for transmitting motion therefrom, the other leg of the U pivotally receiving one end of said wire, the channel section extending beyond the Bourdon tube at both edges thereof and normal to the plane of movement of the said free end by amounts clearing the interior side walls of the housing close enough to prevent excessive movement of said free end in directions normal to the plane of pointer arm travel.

4. The combination of claim 3 including stop plates adjustably fastened to an interior side wall of the housing, spaced apart in the path of the said free end and cooperating with one of the channel section extensions to limit the travel of the said free end in the plane of pointer arm travel.

5. The instrument of claim 1 wherein the scale plate has a longitudinal raised portion bearing the graduations projecting outwardly from the scale plate toward said removable window, and the said pointer moves in a path adjacent the raised portion, the pointer arm length such that the pointer path is not substantially nearer the window than is the said raised scale portion whereby the pointer does not overlap the graduations thus minimizing parallax.

6. In a measuring instrument for visually advising the value of a variable measurement, position, or the like; a housing provided with a scale viewing portion, scale means viewable at said viewing portion, a pressure receiving Bourdon tube in the housing having one end rigidly mounted to the housing and having the other end free for expansive movement, an elongated pointer, a pivot shaft for the inner end portion of the pointer disposed between the ends of the Bourdon tube and arranged for movement of the pointer in a plane parallel to that of the Bourdon tube, a driving connection between the free end of the Bourdon tube and the pivot shaft of the pointer, said driving connection including a spring wire formed with a complete loop intermediate its ends, the loop being arranged to lie in the plane of pointer rotation and offset to an extent such that the center of gravity of the wire is in line with the points of connection of the two ends of the wire.

7. In a measuring instrument for visually advising the value of a variable measurement, position, or the like; a housing provided with scale means, a pressure receiving Bourdon tube in the housing having one end rigidly mounted to the housing and having the other end free for expansive movement, an elongated pointer, a pivot shaft for the inner end portion of the pointer disposed between the ends of the Bourdon tube and arranged for movement of the pointer in a vertical plane parallel to that of the Bourdon tube, a driving connection between the free end of the Bourdon tube and the pivot shaft of the pointer, said driving connection including a spring wire formed with a complete loop intermediate its ends, the loop being arranged to lie in the plane of pointer rotation and offset to an extent such that the center of gravity of the wire is in line with the points of connection of the two ends of the wire.

8. The combination of claim 7 in which the housing has opposed parallel walls, the pointer pivot shaft extends perpendicularly to said walls, and a U-shaped element lies in the plane of the Bourdon tube, said U-shaped element having one leg formed as a channel section receiving the free end of said tube in pressure sealing relation, and the other leg thereof connected with the adjacent end of the spring wire.

9. The combination of claim 8 in which the said channel section has opposite extensions perpendicular to said said walls and engageable therewith to limit movement of the free end of said tube toward either side wall.

10. The combination of claim 7 including a hair spring means disposed in a vertical plane and connected by its ends with the pivot shaft of the pointer and the housing for taking up lost motion between the pointer and the pivot shaft.

11. In a measuring instrument responsive to a variable, the combination comprising, a pivoted indicating member having static balance about its pivot point, means responsive to a variable comprising a member movable in accordance with changes in the variable, a flexible resilient spring wire having an intermediate helical loop operatively connected at its ends to said movable member and said indicating member respectively for transmitting movement of the movable member representative of the variable to said indicating member without the transmission of extraneous vibratory movements.

12. In a measuring instrument responsive to a variable, the combination comprising, a pivoted statically balanced indicating member, a fluid pressure deformable member having an anchored end and a free end movable in accordance with changes in the variable, a flexible spring wire formed with a complete loop intermediate its ends and operatively connected at its ends to said deformable member and said indicating member respectively for transmitting movement of the deformable member representative of the variable to said indicating member without the transmission of extraneous vibratory movements, said loop being offset to an extent relative to the ends of said wire such that the center of gravity of said wire is in line with the points of connection of the two ends of the wire with said deformable member and said indicating member respectively.

13. In a measuring instrument responsive to a variable, the combination comprising, a pivoted indicating member, a fluid pressure deformable member movable in accordance with changes in the variable and having a free end portion and an anchored end portion, an actuating connection between the free end portion of said pressure deformable member and said pivoted indicating member, said actuating connection including a spring wire having an intermediate helical loop positioned in coplanar relation to the end portions of said wire, and a manually adjustable means forming part of said actuating connection for determining the relative position and motion between the free end portion of said deformable member and said pivoted indicating member, the weight distribution of said adjustable means and said pivoted indicating member about the pivot being such as to have static balance about the pivot.

References Cited in the file of this patent

UNITED STATES PATENTS

| | | |
|---|---|---|
| 9,163 | Bourdon | Aug. 3, 1852 |
| 647,164 | Staaf | Apr. 10, 1900 |
| 1,616,628 | Ingham | Feb. 8, 1927 |
| 2,017,183 | Nutsford | Oct. 15, 1935 |
| 2,267,056 | Tracy | Dec. 23, 1941 |
| 2,455,512 | McCoy | Dec. 7, 1948 |

FOREIGN PATENTS

| | | |
|---|---|---|
| 128,051 | France | Dec. 21, 1878 |